(12) United States Patent
Matsui

(10) Patent No.: US 6,512,891 B2
(45) Date of Patent: Jan. 28, 2003

(54) ELECTRIC FLASH DEVICE AND CAMERA

(75) Inventor: Hideki Matsui, Fujisawa (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/982,921

(22) Filed: Oct. 22, 2001

(65) Prior Publication Data

US 2002/0048457 A1 Apr. 25, 2002

(30) Foreign Application Priority Data

Oct. 25, 2000 (JP) ...................................... 2000-325730

(51) Int. Cl.[7] .............................................. G03B 15/05
(52) U.S. Cl. ....................................................... 396/157
(58) Field of Search ......................................... 396/157

(56) References Cited

U.S. PATENT DOCUMENTS 6,094,536 A * 7/2000 Harada ................... 396/157 X

* cited by examiner

Primary Examiner—W. B. Perkey
(74) Attorney, Agent, or Firm—Oliff & Berridge, PLC

(57) ABSTRACT

An electric flash device according to the present invention allows selection between an FP flash which repeats flashing at time intervals recognizable as flat light and a discrete flash and comprises a pre-flash part for performing a pre-flash prior to photographing by a camera, a right condition obtaining part for obtaining from the camera information on a condition of a right amount of light which is determined according to subject brightness when the pre-flash is performed, and an actual-flash part for performing an actual-flash according to the condition of the right amount of light obtained by the right condition obtaining part when the photographing is performed. The pre-flash part performs the discrete flash including one or more flashes as the pre-flash, even when the FP-flash is selected as the actual-flash. Consequently, reduction in energy consumption for performing the pre-flash and shortening of photometry time can be realized.

5 Claims, 3 Drawing Sheets

Fig. 3
A. DISCRETE FLASH
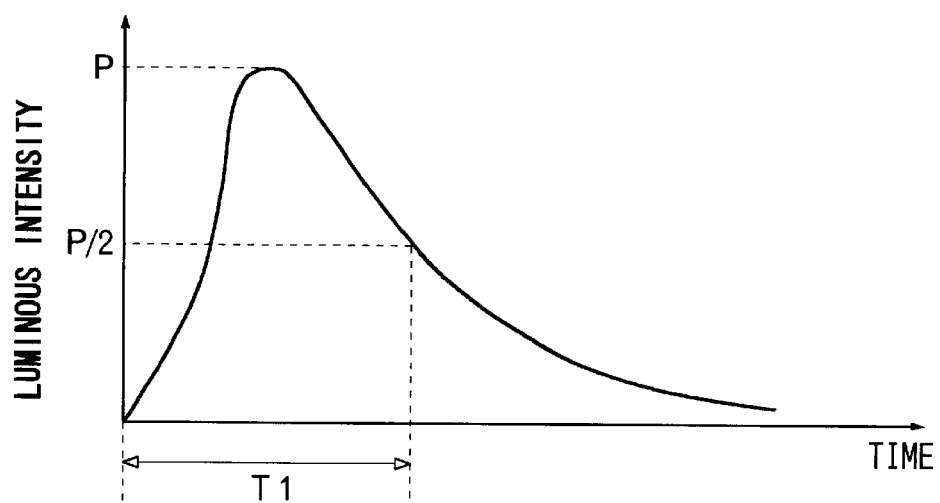
B. FP FLASH
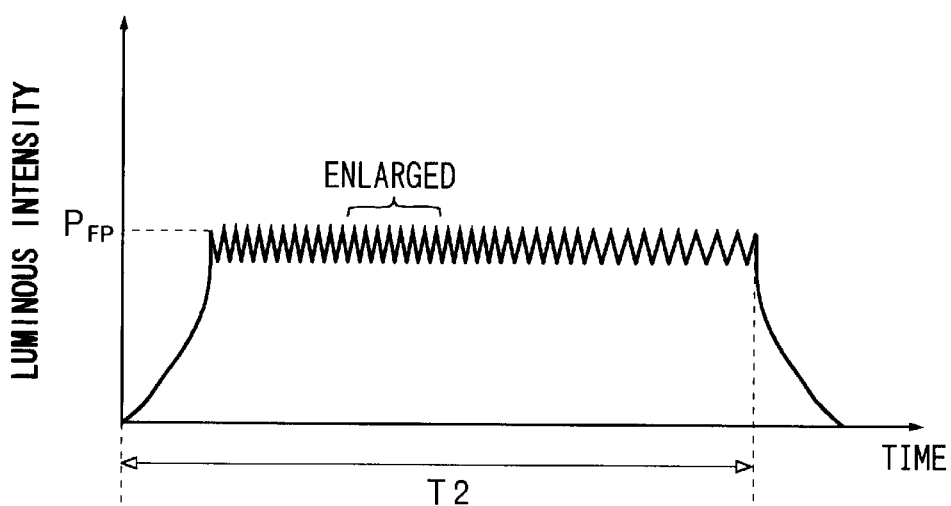
C. PART OF FP FLASH ENLARGED
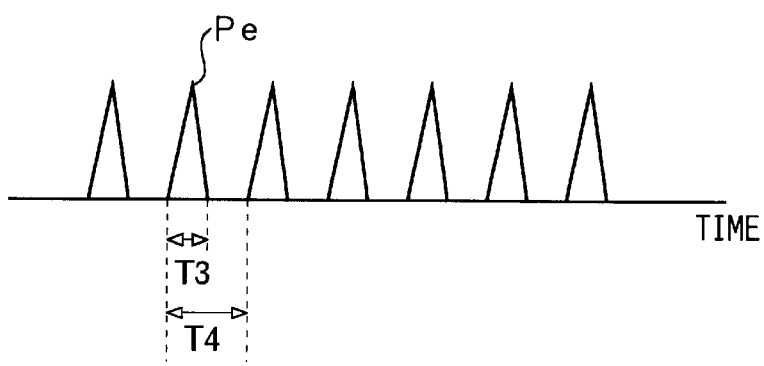

ELECTRIC FLASH DEVICE AND CAMERA

BACKGROUND OF THE INVENTION

1. Field of the Invention

The present invention relates to an electric flash device and a camera, which control flash duration.

2. Description of the Related Art

As a light controlling method of an electric flash device, a method in which the electric flash device is pre-flashed prior to an actual-flash and luminous intensity and flash duration of the actual-flash are controlled according to subject brightness when the pre-flash is performed is conventionally known.

The following two methods are also known as flash methods of the electric flash device.

(1) a method of flashing immediately after a shutter curtain is fully opened (what is called a discrete flash)

(2) a method of repeating consecutive flashes so that a uniform exposure amount is obtained all over a screen with a shutter being in a state of slit traveling (what is called an FP flash)

Generally, the flash duration of the discrete flash is approximately 1 mS and the flash duration of the FP flash is approximately 200 to 300 mS.

The same flash method is conventionally employed both for the actual-flash and for the pre-flash in the electric flash device in order to simplify an arithmetic operation relating to light control conditions of the actual-flash. In other words, when the actual-flash is the FP flash, the pre-flash is always the FP flash and when the actual-flash is the discrete-flash, the pre-flash is always the discrete-flash.

Incidentally, the flash duration of the FP flash is longer than that of the discrete flash and furthermore, repeated switching control of the flashing is required. As a result, the FP flash consumes more luminous energy than the discrete flash. Therefore, when the FP flash is performed as the pre-flash, there exists a problem that much luminous energy is consumed by the electric flash device.

When the FP flash is performed as the pre-flash, there also exists a problem that the flash duration of the pre-flash becomes relatively long and therefore, more time is needed for performing photometry.

The above-described problems become critical problems particularly in consecutive photographing which requires flash illumination. More specifically, when the FP flash is performed as the pre-flash, the more time is needed for re-charging the luminous energy and the more time is required for performing the photometry of the pre-flash in the electric flash device. This results in lengthening time intervals of the consecutive photographing and reducing speed of a consecutive photographing.

SUMMARY OF THE INVENTION

The present invention provides an electric flash device and a camera in which the above problems are solved by selecting a discrete flash to work as a pre-flash.

The present invention is specifically explained as follows.

(1) The electric flash device according to the present invention is an electric flash device allowing selection between "an FP flash which repeats flashing at such time intervals that the repeated flashing is recognizable as flat light" and "a discrete flash", and flashing synchronously with photographing by the camera, the electric flash device comprising: a pre-flash part for performing a pre-flash prior to photographing by the camera; a right condition obtaining part for obtaining from the camera information on a condition of a right amount of light determined according to subject brightness when the pre-flash is performed; and an actual-flash part for performing an actual-flash according to the information on the condition of the right amount of light which is obtained by the right condition obtaining part, the actual-flashing performed when the photographing by the camera is performed, wherein the pre-flash part performs the discrete flash including one flash or a plurality of flashes as the pre-flash, even when the FP flash is selected as the actual-flash.

(2) According to another aspect of the electric flash device of the present invention, the actual-flash part in the electric flash device described in (1) obtains from the camera information on a traveling condition of a shutter curtain for performing the photographing and, according to the condition of the right amount of light and the traveling condition which are determined by the discrete flash, determines a flashed-light waveform of the FP flash for performing the actual-flash.

(3) The camera according to the present invention is a camera which controls an electric flash device allowing selection between "an FP flash which repeats flashing at such time intervals that the repeated flashing is recognizable as flat light" and "a discrete flash", the camera comprising: a photographing part for photographing a subject image; a pre-photometry part for performing photometry on subject brightness while controlling the electric flash device to perform a pre-flash, and determining a condition of a right amount of light for performing an actual-flash according to a result of photometry, prior to photographing by the photographing part; and a light controlling part for performing light control of the electric flash device to perform the actual-flash according to the condition of the right amount of light which is determined by the pre-photometry part, the light control performed when the photographing is performed by the photographing part, wherein when the FP flash is selected as the actual-flash, the pre-photometry part controls the electric flash device to perform the discrete flash as the pre-flash, including one flash or a plurality of flashes, and determines the condition of the right amount of light of the FP flash for performing the actual-flash according to the result of photometry on the subject brightness when the pre-flash is performed.

(4) According to another aspect of the camera of the present invention, the pre-photometry part in the camera described in (3), when the pre-flash is performed, notifies the electric flash device of a starting signal of the discrete flash the same number of times as the discrete flash is performed, and determines the right amount of light for the FP flash to perform the actual-flash according to an amount of light of the pre-flash which is calculated from the number of times the discrete flash is performed, and the photometry result.

(5) According to still another aspect of the camera of the present invention, the pre-photometry part in the camera described in (3), when the pre-flash is performed, obtains from the electric flash device information on the number of times the discrete flash is performed, and determines the right amount of light for the FP flash to perform the actual-flash according to an amount of light of the pre-flash which is calculated from the number of times the discrete flash is performed, and the photometry result.

In the electric flash devices and cameras as described above, when the FP-flash is selected as the actual-flash, the discrete flash including one flash or a plurality of flashes is performed as the pre-flash so that luminous energy required for performing the photometry can be reduced and time required for performing the photometry can be shortened.

Incidentally, the appropriate traveling condition(s) of the shutter curtain mentioned above may be, for example, a specific slit width, a specific shutter curtain speed, a specific aperture value, a specific ISO sensitivity, a specific flash duration, and so on. A value or values of one or more of these appropriate traveling conditions are obtained from the camera by the electric flash device. As for values, which are not obtained from the camera, using specified value(s) is preferred. Furthermore, a flashed-light waveform of the FP flash is preferably determined according to, for example, a frequency of flashes, duty which is a ratio of the flash duration to a flash quenching duration in one cycle, and the luminous intensity.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIG. 3 are views showing characteristic curves of luminous intensity relative to time in a discrete flash and an FP flash.

DESCRIPTION OF THE PREFERRED EMBODIMENTS

An embodiment of the present invention is detailed below.

The Composition of the Embodiment

This embodiment is an embodiment of a camera system composed of an electric flash device and a camera according to the present invention.

Figure 1:
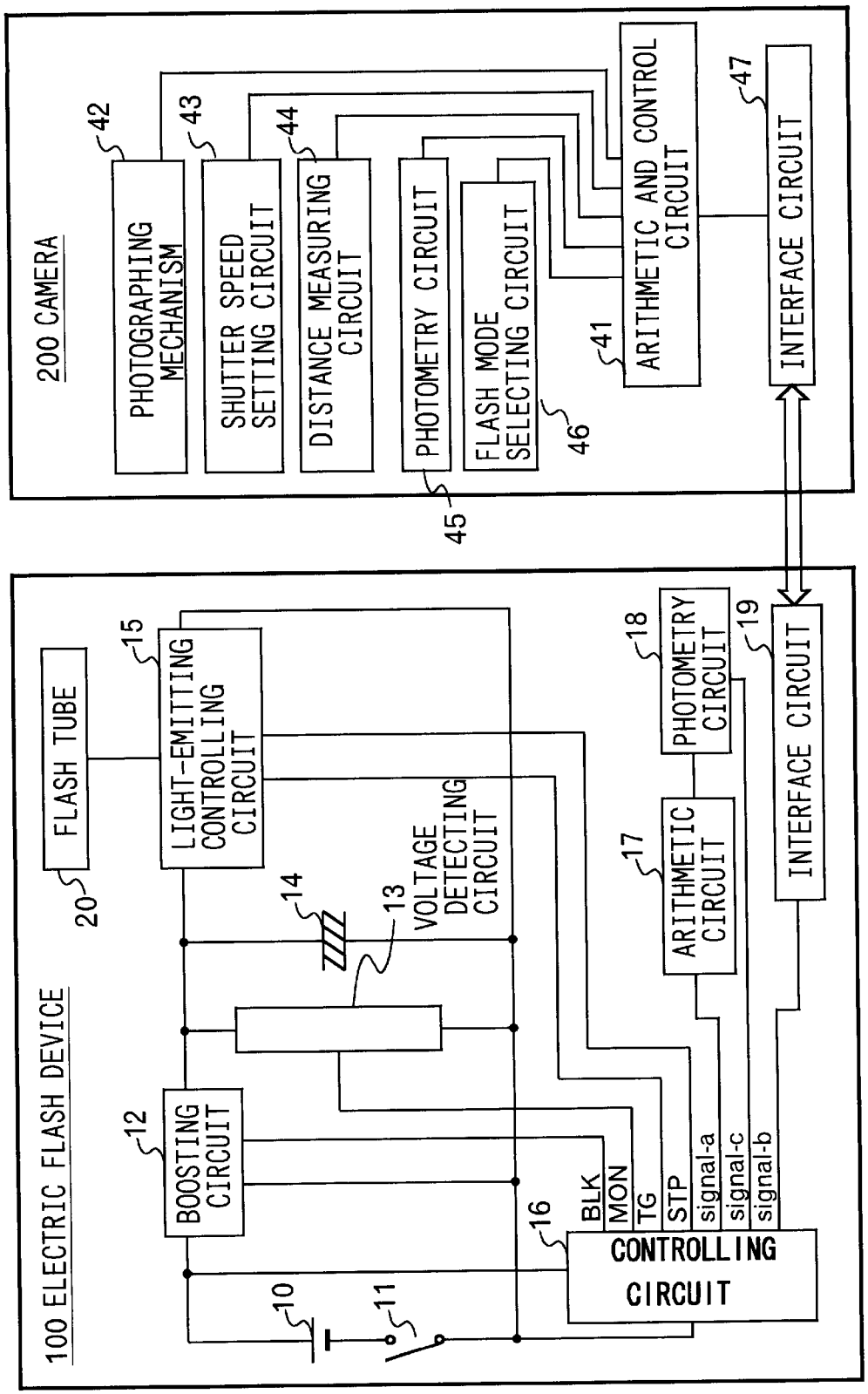
FIG. 1 is a view showing the constitution of a camera system according to the embodiment.

FIG. 1 is a view showing the constitution of the camera system according to the embodiment.

In FIG. 1, an electric flash device 100 is structured to include a power supply 10, a switch 11, a boosting circuit 12, a voltage detecting circuit 13, a capacitor 14, a light-emitting controlling circuit 15, a controlling circuit 16, an arithmetic circuit 17, a photometry circuit 18, an interface circuit 19, and a flash tube 20.

A camera 200 is structured to include an arithmetic and control circuit 41, a photographing mechanism 42, a shutter speed setting circuit 43, a distance measuring circuit 44, a photometry circuit 45, a flash mode selecting circuit 46, and an interface circuit 47.

In the electric flash device 100 shown in FIG. 1, the switch 11 is a power supply switch. When the switch 11 is switched on, a voltage of the power supply 10 is supplied to each of the circuits and then, the controlling circuit 16 outputs a signal to start a boosting operation to the boosting circuit 12 through a signal line BLK. For example, the controlling circuit 16 sets the signal line BLK to a high level "H".

The boosting circuit 12 boosts the supplied voltage to charge the capacitor 14. The capacitor 14 is a main capacitor for storing therein luminous energy and an inter-terminal voltage thereof is detected by the voltage detecting circuit 13. The voltage detecting circuit 13, when a voltage of the capacitor 14 reaches a predetermined value signifying a voltage level enabling flashing or a voltage level for charging completion, outputs to the controlling circuit 16 a signal to that effect through a signal line MON. The controlling circuit 16, when receiving this signal indicating that the predetermined voltage is reached, outputs a signal to stop the boosting operation to the boosting circuit 12 through the signal line BLK. For example, the controlling circuit 16 sets the signal line BLK to a low level "L". Thereby, the boosting circuit 12 stops the boosting operation.

Here, the controlling circuit 16 periodically monitors an output of the voltage detecting circuit 13 even after the boosting operation is stopped and causes the boosting circuit 12 to operate intermittently so that the voltage of the capacitor is maintained at the predetermined value.

The light-emitting controlling circuit 15 receives a signal to start flashing (for example, "H") and a signal to stop flashing (for example "L") from the controlling circuit 16 through a signal line TG. Triggered by the signal to start flashing and the signal to stop flashing, the light-emitting controlling circuit 15 supplies and stops supplying the flash tube 20 with stored electric charge in the capacitor 14 respectively.

The flash tube 20, which is a xenon tube, flashes while consuming the stored energy of the capacitor 14.

The arithmetic circuit 17, which is a microprocessor or the like, performs an arithmetic operation of flashing conditions and notifies the controlling circuit 16 of an arithmetic operation result.

The photometry circuit 18 measures an amount of reflected light which is reflected from a subject, for example, by integrating an amount of received light, and when a predetermined light amount determined by the result of the arithmetic operation is reached, it outputs to the controlling circuit 16 the signal to stop flashing through a signal line signal-c. The photometry circuit 18 also notifies the arithmetic circuit 17 that the signal to stop flashing has been outputted.

Then, the arithmetic circuit 17 exchanges various kinds of information with the arithmetic and control circuit 41 of the camera 200 via a signal line signal-a, the controlling circuit 16, a signal line signal-b, the interface circuit 19 of the electric flash device 100, and the interface circuit 47 of the camera 200. The interface circuits 19, 47 adjust levels and so on of signal transmitted/received between the electric flash device 100 and the camera 200.

The exchanged information may be, for example, a specific shutter speed, a specific shutter slit width, a specific shutter curtain speed, a specific flash duration, a specific aperture value, a specific photographing distance, a specific exposure mode, a specific focal length and a specific ISO sensitivity of a photographing lens, and so on, which are sent from the camera 200, and a specific guide number (GN) of a pre-flash, a specific charging state, a specific light control mode, and so on, which are sent from the electric flash device 100.

In the camera 200 shown in FIG. 1, the photographing mechanism 42 photographs the subject on a film at a designated shutter speed, aperture value, and focus. The shutter speed and/or the aperture value are determined according to a signal outputted from the arithmetic and control circuit 41 according to an exposure mode designated by a photographer (for example, aperture priority, shutter speed priority, and the like). The focus is determined according to the signal outputted from the arithmetic and control circuit 41 and the arithmetic and control circuit 41 computes a right focus according to a measurement result (the photographing distance) of the distance measuring circuit 44 which measures the distance to the subject.

The shutter speed setting circuit 43 is an input part to which the photographer is able to input a desired shutter speed and the designated shutter speed is notified to the arithmetic and control circuit 41.

The flash mode selecting circuit 46 notifies the arithmetic and control circuit 41 of a flash mode for performing photographing which is selected by the photographer. The flash mode has a discrete flash and an FP flash.

The arithmetic and control circuit 41 controls each part of the camera and performs an arithmetic operation of various amounts necessary for performing photographing, for example, the aperture value, the focus, a light amount for performing the photographing (a light amount of an actual-flash), and so on. (Relation between the present invention and the embodiment)

Here, it is explained how the above-described embodiment corresponds to the present invention. Note that the relation to be explained here gives only one interpretation as an example for reference and does not necessarily limit the present invention thereto.

The pre-flash part according to the claims corresponds to the arithmetic circuit 17, the photometry circuit 18, the controlling circuit 16, the light-emitting controlling circuit 15, and the flash tube 20.

The right condition obtaining part according to the claims corresponds to the photometry circuit 45 and the arithmetic and control circuit 41.

The actual-flash part according to the claims corresponds to the arithmetic circuit 17, the photometry circuit 18, the controlling circuit 16, the light-emitting controlling circuit 15, and the flash tube 20.

Incidentally, the same circuits are used for the pre-flash part and the actual-flash part as described above, only the way of controlling light-emitting being different from each other.

Furthermore, the photographing part according to the claims corresponds to the photographing mechanism 42.

The pre-photometry part according to the claims corresponds to the photometry circuit 45 and the arithmetic and control circuit 41.

The light controlling part according to the claims corresponds to the arithmetic and control circuit 41.

The operation and Effect of the Embodiment

Figure 2:
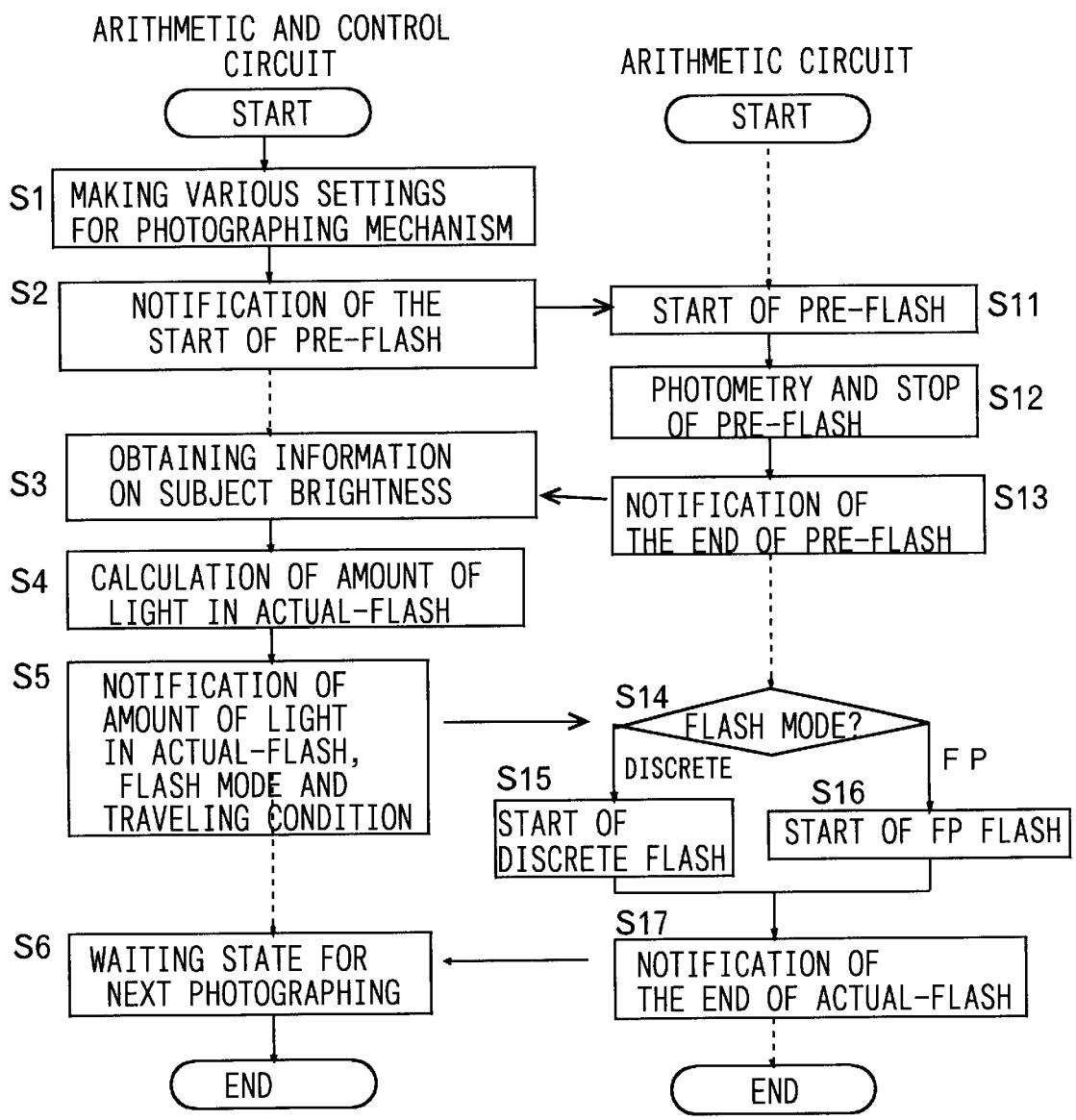
FIG. 2 is a flow chart showing operations of an arithmetic and control circuit and operations of an arithmetic circuit according to the embodiment.

FIG. 2 is a flow chart showing the operations of the arithmetic and control circuit 41 and the operations of the arithmetic circuit 17 according to the embodiment.

In FIG. 2, a photographer inputs the designated flash mode of the electric flash device to the flash mode selecting circuit 46 and a desired shutter speed to the shutter speed setting circuit 43.

The photographer half-depresses a shutter release switch, which is not shown. When the shutter release switch is half-depressed, the arithmetic and control circuit 41 makes preparations for the photographing mechanism 42 to perform photographing, for example, performing an arithmetic operation of the focus according to the photographing distance measured by the distance measuring circuit 44 to adjust the focus of the photographing mechanism 42, and so on (S1).

When the shutter release switch is depressed, the arithmetic and control circuit 41 instructs the arithmetic circuit 17 of the electric flash device 100 via the interface circuits 47, 19 and the controlling circuit 16 that the pre-flash should be performed (S2).

The arithmetic circuit 17, when receiving the instruction of the pre-flash, instructs the controlling circuit 16 to set the signal line TG to "H" (S11). The light-emitting controlling circuit 15, when detecting that the signal line TG is set to "H", causes the flash tube 20 to perform the discrete flash with predetermined luminous intensity at a predetermined regular time interval until detecting that a signal line STP becomes "H". The predetermined regular time interval needs to be longer than flash duration T1 of the discrete flash in order for the flash mode to be the discrete flash.

Here, FIGS. 3 are views showing characteristic curves of the luminous intensity relative to time in the discrete flash and the FP flash.

The flash duration T1 of the discrete flash is time required for the luminous intensity to reach half of peak intensity P from the start of the flash as shown in FIG. 3A. The peak intensity is a maximum value of the luminous intensity in the discrete flash.

The photometry circuit 18 measures the amount of the light reflected from the subject and, when it reaches the predetermined amount of light, sets the signal line signal-c to "H" and sends to the arithmetic circuit 17 a notification to that effect (S12). The controlling circuit 16, when detecting that the signal line signal-c is set to "H", sets the signal line STP to "H".

The arithmetic circuit 17, when receiving the notification from the photometry circuit 18, notifies the camera 200 of the termination of the pre-flash (S13).

Thus, the electric flash device 100, when receiving the notification of the pre-flash, performs the discrete flash including one flash or a plurality of flashes as the pre-flash regardless of whether the discrete flash is selected to work as the actual-flash or the FP flash is selected to work as the actual-flash. Then, the electric flash device 100 repeats the discrete flash until the predetermined light amount is reached so that the electric flash device 100 is capable of measuring the subject brightness accurately even when the amount of the light reflected from the subject is small. When the amount of the light reflected from the subject is large, the subject brightness is of course measured by a singular discrete flash.

Meanwhile, at the time of the pre-flash, the photometry circuit 45 measures the amount of the light reflected from the subject via a photographing lens to measure the subject brightness. The arithmetic and control circuit 41, when receiving the notification of the termination of the pre-flash, obtains the information on the subject brightness from the photometry circuit 45 (S3). The arithmetic and control circuit 41 performs an arithmetic operation of an amount of light required for performing the actual-flash, with the photographing distance, a right exposure value, and the ISO sensitivity taken into consideration (S4). This arithmetic operation method is a generally known and conventionally used method. The arithmetic and control circuit 41 notifies the light amount of the actual-flash, the flash mode, and a traveling condition of the shutter curtain to the arithmetic circuit 17 of the electric flash device 100 (S5).

Here, the notified information on the light amount of the actual-flash may either be the GN which indicates the light amount of the actual-flash itself or a numerical value n which indicates a multiple of the light amount of the pre-flash.

The arithmetic circuit 17 judges whether the flash mode is the discrete flash or the FP flash (S14).

When the flash mode is the discrete flash, the arithmetic circuit 17 calculates the peak intensity P according to the photographing distance, the GN of the light amount of the actual-flash, and the flash duration to cause the flash tube 20 to perform the discrete flash as the actual-flash (S15).

When the flash mode is the FP flash, the arithmetic circuit 17 calculates a flashed-light waveform of the FP flash according to the shutter speed, the slit width, and the GN of the light amount of the actual-flash to cause the flash tube 20 to perform the FP flash as the actual-flash (S16).

Here, the flashed-light waveform of the FP flash is explained.

In the FP flash, which is an illuminating method in which a flash is repeated with luminous intensity PFP at such time intervals that the repeated flashing is recognizable as flat light as shown in FIG. 3B, a peak flash lasts only for regular duration T3 during a regular time interval T4 (a cycle 1/T4) as shown in FIG. 3C in which a part of the flat light (time T2) is enlarged. Generally, the flash duration T3 is approximately several tens μS and the cycle 1/T4 is 20 to30 kHz.

Therefore, with focal plane shutters, the amount of light depends on how many peaks Pe exist within the slit width. For example, supposing one peak Pe is the amount of light corresponding to GN1 (ISO100·m), when the time T4 is adjusted according to the shutter speed so that one peak Pe exists within the slit width, an amount of light being incident on a film at the time of the photographing becomes GN1 (ISO100·m). Meanwhile, when the time T4 is adjusted according to the shutter speed so that four peaks Pe exist within the slit width, the amount of light being incident on the film at the time of the photographing becomes GN2 (ISO100·m).

The amount of light of one peak is determined by the luminous intensity $P_{FP}$, the flash duration T3, and the time interval T4.

Therefore, the arithmetic circuit 17 is capable of determining the time interval T4 according to the shutter speed, the slit width, and the GN of the light amount of the actual-flash, for example, according to the shutter speed and the slit width, and determining the flash duration T3 according to the GN of the light amount of the actual-flash.

Incidentally, when the predetermined light amount of the actual-flash is not obtainable with the slit width notified by the camera, a notification to that effect is given thereto and the camera adjusts the slit width to a wider width to cope with the situation. Furthermore, the arithmetic circuit 17 may thus determine the slit width according to the shutter speed and the time interval T4 and determine the flash duration T3 according to the GN of the light amount of the actual-flash.

Incidentally, though the arithmetic circuit 17 and the photometry circuit 18 in the electric flash device 100 control the discrete flash in the pre-flash and the discrete flash and the FP flash in the actual-flash in the embodiment, the arithmetic and control circuit 41 in the camera 200 may control them by outputting a control signal to the electric flash device 100. In this case, the arithmetic and control circuit 41 instructs the electric flash device 100 to perform the discrete flash as the pre-flash and when the photometry circuit 45 detects that the light reflected from the subject reaches the predetermined amount of light, causes the discrete flash of the pre-flash to stop.

Since the camera 200 controls the pre-flash and the actual-flash as described above, a conventional electric flash device is usable as the electric flash device 100.

Furthermore, though the arithmetic and control circuit 41 calculates the light amount of the actual-flash by measuring the subject brightness at the time of the pre-flash according to the output of the photometry circuit 45 in the embodiment, the information on the subject brightness at the time of the pre-flash may be obtained from the electric flash device 100. In this case, for example, the arithmetic circuit 17 calculates the pre-flash duration and the number of times the discrete flash is performed in S13 of FIG. 2 and also according to the notification from the photometry circuit 18, and notifies the camera 200 of the result. The arithmetic and control circuit 41 calculates the total amount of light of the discrete flash according to the number of times the discrete flash is performed and calculates the light amount of the actual-flash according to the output of the photometry circuit 45.

The invention is not limited to the above embodiment and various modifications may be made without departing from the spirit and scope of the invention. Any improvement may be made in part or all of the components.

What is claimed is:

1. An electric flash device allowing selection between "an FP flash which repeats flashing at such time intervals that the repeated flashing is recognizable as flat light" and "a discrete flash", and flashing synchronously with photographing by a camera, the electric flash device comprising:

a pre-flash part for performing a pre-flash prior to photographing by the camera;

a right condition obtaining part for obtaining from the camera information on a condition of a right amount of light determined according to subject brightness when the pre-flash is performed; and an actual-flash part for performing an actual-flash according to the information on the condition of the right amount of light which is obtained by said right condition obtaining part, the actual-flashing performed when the photographing by the camera is performed, wherein said pre-flash part performs the discrete flash including one of a flash and a plurality of flashes as the pre-flash, even when the FP flash is selected as the actual-flash.

2. The electric flash device according to claim 1, wherein said actual-flash part obtains from the camera information on a traveling condition of a shutter curtain for performing the photographing and, according to the condition of the right amount of light and the traveling condition which are determined by the discrete flash, determines a flashed-light waveform of the FP flash for performing the actual-flash.

3. A camera which controls an electric flash device allowing selection between "an FP flash which repeats flashing at such time intervals that the repeated flashing is recognizable as flat light" and "a discrete flash", the camera comprising:

a photographing part for photographing a subject image;

a pre-photometry part for performing photometry on subject brightness while controlling the electric flash device to perform a pre-flash, and determining a condition of a right amount of light for performing an actual-flash according to a result of photometry, prior to photographing by the photographing part; and a light controlling part for performing light control of the electric flash device to perform the actual-flash according to the condition of the right amount of light which is determined by said pre-photometry part, the light control performed when the photographing is performed by said photographing part, wherein when the FP flash is selected as the actual-flash, said pre-photometry part controls the electric flash device to perform the discrete flash as the pre-flash, including one of a flash and a plurality of flashes, and determines the condition of the right amount of light of the FP flash for performing the actual-flash according to the result of photometry on the subject brightness when the pre-flash is performed.

4. The camera according to claim 3, wherein when the pre-flash is performed, said pre-photometry part notifies the electric flash device of a starting signal of the discrete flash the same number of times as the discrete flash is performed, and determines the right amount of light for the FP flash to perform the actual-flash according to an amount of light of the pre-flash which is calculated from the number of times the discrete flash is performed, and the result of photometry.

5. The camera according to claim 3, wherein when the pre-flash is performed, said pre-photometry part obtains from the electric flash device information on the number of times the discrete flash is performed, and determines the right amount of light for the FP flash to perform the actual-flash according to an amount of light of the pre-flash which is calculated from the number of times the discrete flash is performed, and the result of photometry.

* * * * *